US010070051B1

(12) United States Patent
Tudor et al.

(10) Patent No.: US 10,070,051 B1
(45) Date of Patent: Sep. 4, 2018

(54) METHODS FOR ENSURING THAT VIDEO OR IMAGES ARE CAPTURED AT A DETERMINED ORIENTATION

(71) Applicants: Charles R. Tudor, Virginia Beach, VA (US); Dani R. Sleiman, Virginia Beach, VA (US); Christopher D. Davis, Chesapeake, VA (US)

(72) Inventors: Charles R. Tudor, Virginia Beach, VA (US); Dani R. Sleiman, Virginia Beach, VA (US); Christopher D. Davis, Chesapeake, VA (US)

(73) Assignee: Worldwide Live Holding, LLC, Chesapeake, VA (US)

( * ) Notice: Subject to any disclaimer, the term of this patent is extended or adjusted under 35 U.S.C. 154(b) by 0 days.

(21) Appl. No.: 15/478,256

(22) Filed: Apr. 4, 2017

Related U.S. Application Data

(60) Provisional application No. 62/403,629, filed on Oct. 3, 2016, provisional application No. 62/319,044, filed on Apr. 6, 2016.

(51) Int. Cl.
*H04N 5/232* (2006.01)
*H04N 13/296* (2018.01)

(52) U.S. Cl.
CPC ......... *H04N 5/23222* (2013.01); *H04N 5/232* (2013.01); *H04N 5/23293* (2013.01); *H04N 13/296* (2018.05)

(58) Field of Classification Search
CPC .............. H04N 5/23222; H04N 5/232; H04N 5/23293; H04N 13/296; H04N 13/243
See application file for complete search history.

(56) References Cited

U.S. PATENT DOCUMENTS 5,914,941 A 6/1999 Janky
6,711,622 B1 3/2004 Fuller et al.
(Continued)

FOREIGN PATENT DOCUMENTS

CN 103259709 8/2013
CN 103501392 1/2014
(Continued)

OTHER PUBLICATIONS

Orient—The Self Aligning Camera—http://www.apppicker.com/apps/820477384/orient-the-self-aligning-camera.

*Primary Examiner* — Hung Lam
(74) *Attorney, Agent, or Firm* — Shaddock Law Group, PC

(57) ABSTRACT

A method for capturing video or still images at a determined orientation, via a mobile device, including accessing at least some information regarding a desired orientation preference; accessing at least some information regarding an orientation of the mobile device; comparing the information regarding the orientation of the mobile device to the information regarding the desired orientation preference; determining whether the information regarding the orientation of the mobile device matches the information regarding the desired orientation preference, within a degree of variance; disabling, if the information regarding the orientation of the mobile device does not match the desired orientation preference, within the degree of variance, a video or still image capture function of the mobile device; and enabling, if the information regarding the orientation of the mobile device matches the desired orientation preference, within the degree of variance, a video or still image capture function of the mobile device.

14 Claims, 9 Drawing Sheets

(56) References Cited

U.S. PATENT DOCUMENTS

| | | |
|---|---|---|
| 6,970,915 B1 | 11/2005 | Partovi et al. |
| 7,738,417 B2 | 6/2010 | Li |
| 7,936,790 B2 | 5/2011 | Schmidt et al. |
| 8,244,068 B2 | 8/2012 | Thorn |
| 8,483,654 B2 | 7/2013 | Levinson et al. |
| 8,526,985 B2 | 9/2013 | Cilli et al. |
| 8,606,073 B2 | 12/2013 | Woodman |
| 8,819,738 B2 | 8/2014 | Gresta |
| 9,084,021 B2 | 7/2015 | Bieselt et al. |
| 9,251,852 B2 | 2/2016 | Burns |
| 9,363,539 B2 | 6/2016 | Das |
| 2002/0085029 A1 | 7/2002 | Ghani |
| 2002/0087592 A1 | 7/2002 | Ghani |
| 2004/0073437 A1 | 4/2004 | Halgas, Jr. et al. |
| 2006/0206561 A1 | 9/2006 | Chen et al. |
| 2007/0239562 A1 | 10/2007 | Lawson |
| 2007/0297359 A1 | 12/2007 | Li |
| 2008/0133767 A1 | 6/2008 | Birrer et al. |
| 2011/0088068 A1 | 4/2011 | Patnoe et al. |
| 2011/0285863 A1 | 11/2011 | Burke et al. |
| 2011/0298888 A1* | 12/2011 | Shimada ............... G03B 37/00 348/37 |
| 2012/0064947 A1 | 3/2012 | Yi et al. |
| 2012/0284755 A1 | 11/2012 | Keret et al. |
| 2013/0286211 A1 | 10/2013 | Cao |
| 2013/0312041 A1 | 11/2013 | Gresta |
| 2014/0098139 A1* | 4/2014 | Matsunaga ............. G09G 5/34 345/651 |
| 2014/0098197 A1* | 4/2014 | Geris ................... H04N 13/296 348/48 |
| 2014/0101781 A1 | 4/2014 | Bouknight |
| 2014/0153897 A1* | 6/2014 | Hosoe ................... H04N 5/772 386/230 |
| 2014/0160223 A1 | 6/2014 | Bieselt et al. |
| 2014/0331255 A1 | 11/2014 | Howe et al. |
| 2015/0020135 A1 | 1/2015 | Frusina et al. |
| 2015/0042447 A1 | 2/2015 | Vogt et al. |
| 2015/0043892 A1 | 2/2015 | Groman |
| 2015/0295726 A1 | 10/2015 | Bland |
| 2016/0007067 A1 | 1/2016 | Lai et al. |
| 2016/0014455 A1 | 1/2016 | Jabara et al. |
| 2016/0037187 A1 | 2/2016 | Das |
| 2016/0057457 A1 | 2/2016 | Clements et al. |
| 2016/0105770 A1 | 4/2016 | Christian |
| 2016/0156953 A1 | 6/2016 | Phipps et al. |

FOREIGN PATENT DOCUMENTS

| | | |
|---|---|---|
| KR | 101457529 | 11/2014 |
| WO | WO2011043886 | 4/2011 |
| WO | WO2014035818 | 3/2014 |
| WO | WO2015107522 | 7/2015 |

* cited by examiner

METHODS FOR ENSURING THAT VIDEO OR IMAGES ARE CAPTURED AT A DETERMINED ORIENTATION

CROSS-REFERENCE TO RELATED APPLICATIONS

This patent application claims the benefit of U.S. Patent Application Ser. No. 62/319,044, filed Apr. 6, 2016 and U.S. Patent Application Ser. No. 62/403,629, filed Oct. 3, 2016, the disclosures of which are incorporated herein in their entireties by reference.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

NOTICE OF COPYRIGHTED MATERIAL

The disclosure of this patent document contains material that is subject to copyright protection. The copyright owner has no objection to the reproduction by anyone of the patent document or the patent disclosure, as it appears in the Patent and Trademark Office patent file or records, but otherwise reserves all copyright rights whatsoever. Unless otherwise noted, all trademarks and service marks identified herein are owned by the applicant.

BACKGROUND OF THE PRESENT DISCLOSURE

1. Field of the Present Disclosure

The present disclosure relates generally to the field of mobile or other electronic devices capable of capturing video or still images. More specifically, the presently disclosed systems and/or methods relate to methods for ensuring that video or still images captured by an electronic device are captured at a determined orientation and/or aspect ratio.

2. Description of Related Art

Numerous mobile electronic devices, such as, for example, mobile phones, tablets, portable media players, and multi-purpose pocket computers include at least one camera in that allows the mobile electronic device to capture and store or stream video or still images.

These mobile electronic devices typically allow a user to take video or still images in a "portrait" or a "landscape" orientation, based on the physical orientation of the mobile electronic device. As is typically understood and as generally used herein, a portrait orientation provides a rectangular display and captures a resulting rectangular video or still image having a height greater than the width of the (i.e., a vertical height greater than the horizontal width). A landscape orientation provides a rectangular display and captures a resulting rectangular video or still image having a width greater than the height (i.e., a horizontal width greater than a vertical height). Generally, the overall pixel count of the video or image does not change between a portrait orientation and a landscape orientation, the rectangular display and resulting rectangular video or still image are merely different orientations of the same rectangular area.

Whether the mobile electronic device captures or produces a portrait or landscape oriented video or still image is dependent upon the physical orientation of the mobile electronic device. When the mobile electronic device is held in a portrait orientation, the mobile electronic device provides a portrait display and captures a portrait video or still image. When the mobile electronic devices held in a landscape orientation, a mobile electronic device provides a landscape display and captures a landscape video or still image.

This allows users to decide whether they would prefer to capture a video or still image in a vertical (portrait) or horizontal (landscape) orientation for each discrete video or still image.

Any discussion of documents, acts, materials, devices, articles, or the like, which has been included in the present specification is not to be taken as an admission that any or all of these matters form part of the prior art base or were common general knowledge in the field relevant to the present disclosure as it existed before the priority date of each claim of this application.

BRIEF SUMMARY OF THE PRESENT DISCLOSURE

However, allowing a user to determine the orientation at which video and still images are captured has various shortcomings. Currently known mobile electronic devices themselves, social media, and other video streaming applications used in mobile electronic devices allow the user to determine the orientation which the video or still images are captured. For example, users are able to hold their mobile electronic devices vertically to shoot and stream video. This orientation produces a portrait (vertically formatted) video or image that does not display well on present industry standard, horizontal display formats used for television and other displays and broadcast. Thus, instead of producing a video in a standard 16:9 display format, a user may produce a video in a 9:16 display format.

Streaming of horizontal video is optimal for television and current computer screens. Unfortunately, many users orient their mobile electronic devices in a vertical manner and produce vertical videos.

In order to overcome these and various other shortcomings in the video and still image capturing features of present mobile electronic devices, various exemplary, nonlimiting embodiments of the present disclosure optionally provide a feature that allows a desired orientation preference to be established for video or still image capture. The desired orientation preference may be established by the user or by an ultimate end user of the video or still image capture. Once a desired orientation preference has been established for the mobile electronic device, video or still image capture in a mobile electronic device is disabled unless and until the physical orientation of the mobile electronic device matches the established orientation preference.

In various exemplary embodiments, if the user attempts to capture video or still images at an orientation that does not match the established orientation preference, the video or still image capture function of the mobile electronic device is disabled and a device reorientation message is displayed to the user. When the user reorients the mobile electronic device, such that the physical orientation of the mobile electronic device matches the established orientation preference, the device reorientation message is removed from the display and the video or still image capture function of the mobile electronic device is enabled.

This exemplary, nonlimiting embodiment requires user compliance and reorientation of the mobile electronic device in order to enable the video or still image capture function of the mobile electronic device.

In various exemplary, nonlimiting embodiments of the present disclosure, an application (app) or software operating on the mobile electronic device controls the video or still image capture feature of the mobile electronic device to orient the video or still image capture, through software, to force the mobile electronic device to capture video or still images at the established orientation preference (whether portrait or landscape), regardless of the physical orientation of the mobile electronic device. This provides video or still image capture according to the established orientation preference, regardless of the physical orientation of the mobile electronic device and does not require user compliance.

In various exemplary, nonlimiting embodiments of the present disclosure, an application (app) or software operating on the mobile electronic device controls the mobile electronic device to re-scale and/or appropriately crop landscape or portrait video to a landscape (i.e., horizontal or widescreen) perspective, before capturing and/or transmitting video or still images. This feature utilizes, for example, the mobile electronic device's internal gyroscope to maintain a horizontal perspective no matter the viewing angle tilt or orientation of the device.

In various exemplary, nonlimiting embodiments of the present disclosure, video streaming can be provided to, for example, professional broadcasters in a preferred landscape or widescreen format by forcing the app user to turn their mobile electronic device horizontally for the camera to turn on and function. In certain exemplary embodiments, if the user chooses to stream video from the app while holding the mobile electronic device at an orientation other than the preferred landscape orientation a screen appears with an animation and statement showing the user and instructing the user to turn the mobile electronic device to the preferred or desired orientation.

In various exemplary, nonlimiting embodiments of the present disclosure, the systems and/or methods of the present disclosure may optionally orient the video or still image capture to a desired orientation through software, to force a desired horizontal or vertical video or still image capture, regardless of device orientation.

In various exemplary, nonlimiting embodiments of the present disclosure, the systems and/or methods of the present disclosure provide a method for capturing video or still images at a determined orientation, via a camera associated with a mobile electronic device, comprising accessing at least some information regarding a desired orientation preference for the mobile electronic device; accessing at least some information regarding a physical orientation of the mobile electronic device; comparing the information regarding the physical orientation of the mobile electronic device to the information regarding the desired orientation preference for the mobile electronic device; determining whether the information regarding the physical orientation of the mobile electronic device matches the information regarding the desired orientation preference for the mobile electronic device, within a determined degree of variance; and disabling, if the information regarding the physical orientation of the mobile electronic device does not match the desired orientation preference for the mobile electronic device, within the determined degree of variance, a video or still image capture function of the mobile electronic device.

In certain exemplary, nonlimiting embodiments of the present disclosure, the systems and/or methods of the present disclosure further allow for presenting, while the video or still image capture function of the mobile electronic device is disabled, a device reorientation message; accessing at least some subsequent information regarding a subsequent physical orientation of the mobile electronic device; determining whether the subsequent information regarding the subsequent physical orientation of the mobile electronic device matches the information regarding the desired orientation preference for the mobile electronic device, within the determined degree of variance; and enabling, if the subsequent information regarding the subsequent physical orientation of the mobile electronic device matches the desired orientation preference for the mobile electronic device, within the determined degree of variance, the video or still image capture function of the mobile electronic device.

In certain exemplary, nonlimiting embodiments at least some information regarding the desired orientation preference for the mobile electronic device is established by a user of the mobile electronic device or an application running on the mobile electronic device.

In certain exemplary, nonlimiting embodiments at least some information regarding the physical orientation of the mobile electronic device is determined based on information from sensors embedded within the mobile electronic device.

In certain exemplary, nonlimiting embodiments the determined degree of variance is established such that the determination that the information regarding the desired orientation preference for the mobile electronic device matches the information regarding the physical orientation of the mobile electronic device if the compared information is within a determined range.

In certain exemplary, nonlimiting embodiments the device reorientation message is presented on a display of the mobile electronic device and optionally provides information regarding the desired orientation preference for the mobile electronic device. Alternatively, the device reorientation message may optionally be presented as an audio alert or message, via an audio interface of the mobile electronic device.

In certain exemplary, nonlimiting embodiments the method begins each time a video or still image capture function of the mobile electronic device is accessed.

In certain exemplary, nonlimiting embodiments of the present disclosure, the systems and/or methods of the present disclosure further allow for accessing at least some subsequent information regarding a subsequent physical orientation of said mobile electronic device; determining whether said subsequent information regarding said subsequent physical orientation of said mobile electronic device matches said information regarding said desired orientation preference for said mobile electronic device, within said determined degree of variance; and presenting, while said video or still image capture function of said mobile electronic device is enabled, a device reorientation message, while continuing to enable said video or still image capture function.

In various exemplary, nonlimiting embodiments of the present disclosure, the systems and/or methods of the present disclosure provide a method for capturing video or still images at a determined orientation, via a camera associated with a mobile electronic device, comprising accessing at least some information regarding a desired orientation preference for the mobile electronic device; accessing at least some information regarding a physical orientation of the mobile electronic device; comparing the information regarding the physical orientation of the mobile electronic device to the information regarding the desired orientation preference for the mobile electronic device; determining whether the information regarding the physical orientation of the mobile electronic device matches the information regarding the desired orientation preference for the mobile electronic device, within a determined degree of variance; enabling, if the information regarding the physical orientation of the mobile electronic device matches the desired orientation preference for the mobile electronic device, within the determined degree of variance, a video or still image capture function of the mobile electronic device; disabling, if the information regarding the physical orientation of the mobile electronic device does not match the desired orientation preference for the mobile electronic device, within the determined degree of variance, the video or still image capture function of the mobile electronic device; presenting, while the video or still image capture function of the mobile electronic device is disabled, a device reorientation message, wherein the device reorientation message provides information regarding the desired orientation preference for the mobile electronic device; accessing at least some subsequent information regarding a subsequent physical orientation of the mobile electronic device; determining whether the subsequent information regarding the subsequent physical orientation of the mobile electronic device matches the information regarding the desired orientation preference for the mobile electronic device, within the determined degree of variance; and enabling, if the subsequent information regarding the subsequent physical orientation of the mobile electronic device matches the desired orientation preference for the mobile electronic device, within the determined degree of variance, the video or still image capture function of the mobile electronic device.

In various exemplary, nonlimiting embodiments of the present disclosure, the systems and/or methods of the present disclosure provide a method for capturing video or still images at a determined orientation, via a camera associated with a mobile electronic device, comprising accessing at least some information regarding a desired orientation preference for the mobile electronic device; accessing at least some information regarding a physical orientation of the mobile electronic device; comparing the information regarding the physical orientation of the mobile electronic device to the information regarding the desired orientation preference for the mobile electronic device; determining whether the information regarding the physical orientation of the mobile electronic device matches the information regarding the desired orientation preference for the mobile electronic device, within a determined degree of variance; enabling, if it is determined that the physical orientation of the mobile electronic device matches the information regarding the desired orientation preference for the mobile electronic device, within the determined degree of variance, capturing of the video or still images, as an input from the camera, at the physical orientation of the mobile electronic device, and displaying the input from the camera, via a display of the mobile electronic device, within a record area representing the orientation and/or aspect ratio at which the video or still images will be captured; and orienting, if it is determined that the physical orientation of the mobile electronic device does not match the information regarding the desired orientation preference for the mobile electronic device, within the determined degree of variance, an input from the camera, via software embedded within or accessed by the mobile electronic device, such that the video or still images will be captured at the desired orientation preference, and displaying the input from the camera, via the display of the mobile electronic device, as the video or still images will be captured.

In various exemplary, nonlimiting embodiments of the present disclosure, the systems and/or methods of the present disclosure further allow for accessing at least some subsequent information regarding a subsequent physical orientation of the mobile electronic device; determining whether the subsequent information regarding the subsequent physical orientation of the mobile electronic device matches the information regarding the desired orientation preference for the mobile electronic device, within a determined degree of variance; enabling, if it is determined that the subsequent information regarding the subsequent physical orientation of the mobile electronic device matches the information regarding the desired orientation preference for the mobile electronic device, within the determined degree of variance, capturing of the video or still images, as an input from the camera, at the physical orientation of the mobile electronic device, and displaying the input from the camera, via a display of the mobile electronic device, within a record area representing the orientation and/or aspect ratio at which the video or still images will be captured; and orienting, if it is determined that the subsequent information regarding the subsequent physical orientation of the mobile electronic device does not match the information regarding the desired orientation preference for the mobile electronic device, within the determined degree of variance, an input from the camera, via software embedded within or accessed by the mobile electronic device, such that the video or still images will be captured at the desired orientation preference, and displaying the input from the camera, via the display of the mobile electronic device, as the video or still images will be captured.

In certain exemplary, nonlimiting embodiments of the present disclosure, the systems and/or methods of the present disclosure further allow for re-scaling and/or cropping the input from the camera to match the desired orientation preference for the mobile electronic device.

Accordingly, the presently disclosed systems and/or methods separately and optionally provide methods for requiring a user to orient a mobile electronic device to a desired orientation in order to enable video or still image capture by the mobile electronic device.

The presently disclosed systems and/or methods separately and optionally provide methods for orienting video or still images being captured by a mobile electronic device to an establish orientation preference, regardless of the physical orientation of the mobile electronic device.

The presently disclosed systems and/or methods separately and optionally provide methods for ensuring that video or still images captured by a mobile electronic device are captured at an orientation that most closely resembles the orientation of the display or device on which the video or still images are to be displayed or streamed.

The presently disclosed systems and/or methods separately and optionally provide methods for ensuring that video or still images captured by a mobile electronic device are captured at an orientation that is optimized for the ultimate end use of the video or still images.

The presently disclosed systems and/or methods separately and optionally provide methods for achieving desired orientation of video or still images captured by a mobile electronic device that are easily performed by a user.

The presently disclosed systems and/or methods separately and optionally provide methods that instruct a user to turn a mobile electronic device to a particular orientation in order to make a camera function of the mobile electronic device available to the user.

The presently disclosed systems and/or methods separately and optionally provide a method for disabling video capture from a mobile electronic device if the mobile electronic device is oriented in an undesirable manner.

The presently disclosed systems and/or methods separately and optionally provides a method for capturing video or still images at a desired orientation, regardless of device orientation, without compliance by or interaction from a user.

These and other aspects, features, and advantages of the presently disclosed systems and/or methods are described in or are apparent from the following detailed description of the exemplary, non-limiting embodiments of the presently disclosed systems and/or methods and the accompanying figures. Other aspects and features of embodiments of the presently disclosed systems and/or methods will become apparent to those of ordinary skill in the art upon reviewing the following description of specific, exemplary embodiments of the presently disclosed systems and/or methods in concert with the figures. While features of the presently disclosed systems and/or methods may be discussed relative to certain embodiments and figures, all embodiments of the presently disclosed systems and/or methods can include one or more of the features discussed herein. Further, while one or more embodiments may be discussed as having certain advantageous features, one or more of such features may also be used with the various embodiments of the systems and/or methods discussed herein. In similar fashion, while exemplary embodiments may be discussed below as device, system, or method embodiments, it is to be understood that such exemplary embodiments can be implemented in various devices, systems, and methods of the presently disclosed systems and/or methods.

Any benefits, advantages, or solutions to problems that are described herein with regard to specific embodiments are not intended to be construed as a critical, required, or essential feature(s) or element(s) of the presently disclosed systems and/or methods or the claims.

BRIEF DESCRIPTION OF THE SEVERAL VIEWS OF THE DRAWINGS

As required, detailed exemplary embodiments of the presently disclosed systems and/or methods are disclosed herein; however, it is to be understood that the disclosed embodiments are merely exemplary of the presently disclosed systems and/or methods that may be embodied in various and alternative forms, within the scope of the presently disclosed systems and/or methods. The figures are not necessarily to scale; some features may be exaggerated or minimized to illustrate details of particular components. Therefore, specific structural and functional details disclosed herein are not to be interpreted as limiting, but merely as a basis for the claims and as a representative basis for teaching one skilled in the art to employ the presently disclosed systems and/or methods.

The exemplary embodiments of the presently disclosed systems and/or methods will be described in detail, with reference to the following figures, wherein like reference numerals refer to like parts throughout the several views, and wherein.

DETAILED DESCRIPTION OF EXEMPLARY EMBODIMENTS OF THE PRESENT DISCLOSURE

Figure 1:
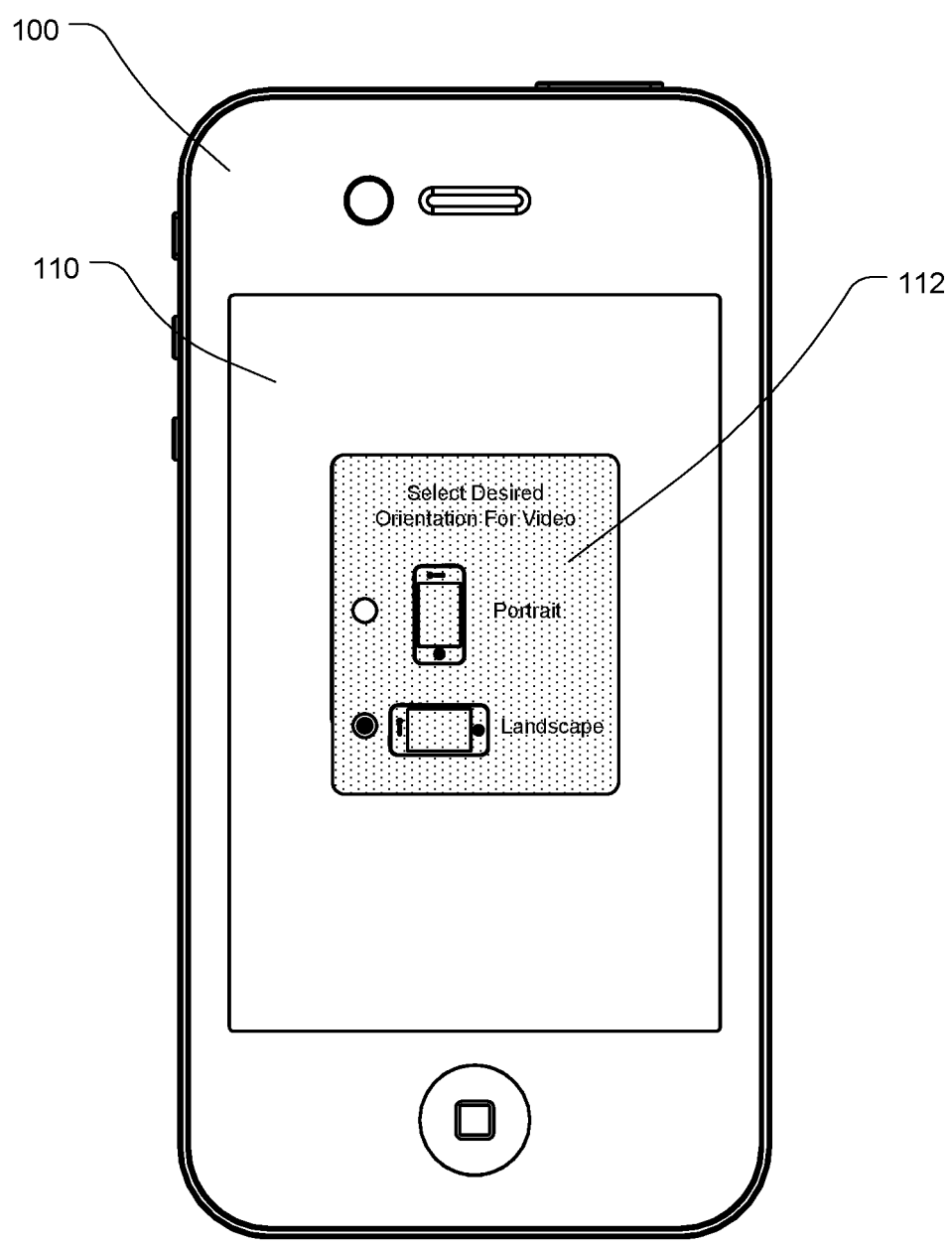
FIG. 1 illustrates an exemplary embodiment of an established orientation preference being identified for a mobile electronic device, according to the presently disclosed systems and/or methods.

For simplicity and clarification, the design factors and operating principles of video or image capture according to the presently disclosed systems and/or methods are explained with reference to various exemplary embodiments of video or image capture according to the presently disclosed systems and/or methods. The basic explanation of the design factors and operating principles of video or image capture is applicable for the understanding, design, and operation of video or image capture of the presently disclosed systems and/or methods. It should be appreciated that video or image capture can be adapted to any applications where video or image capture can be used.

As used herein, the word "may" is meant to convey a permissive sense (i.e., meaning "having the potential to"), rather than a mandatory sense (i.e., meaning "must"). Unless stated otherwise, terms such as "first" and "second" are used to arbitrarily distinguish between the exemplary embodiments and/or elements such terms describe. Thus, these terms are not necessarily intended to indicate temporal or other prioritization of such exemplary embodiments and/or elements.

The terms "a" and "an" are defined as one or more unless stated otherwise. Throughout this application, the terms "comprise" (and any form of comprise, such as "comprises" and "comprising"), "have" (and any form of have, such as "has" and "having"), "include", (and any form of include, such as "includes" and "including") and "contain" (and any form of contain, such as "contains" and "containing") are used as open-ended linking verbs. It will be understood that these terms are meant to imply the inclusion of a stated element, integer, step, or group of elements, integers, or steps, but not the exclusion of any other element, integer, step, or group of elements, integers, or steps. As a result, a system, method, or apparatus that "comprises", "has", "includes", or "contains" one or more elements possesses those one or more elements but is not limited to possessing only those one or more elements. Similarly, a method or process that "comprises", "has", "includes" or "contains" one or more operations possesses those one or more operations but is not limited to possessing only those one or more operations.

It should also be appreciated that the terms "mobile electronic device", "video or still image", "portrait", and "landscape" are used for basic explanation and understanding of the operation of the systems, methods, and apparatuses of the presently disclosed systems and/or methods. Therefore, the terms "mobile electronic device", "video or still image", "portrait", and "landscape" are not to be construed as limiting the systems, methods, and apparatuses of the presently disclosed systems and/or methods. Thus, for example, the term "mobile electronic device" is to be understood to broadly include any mobile phone, smart phone, tablet, portable media player, multi-purpose pocket computer, iPad, Google Tablet, Microsoft Tablet, Android platform, point of view camera, still or video camera, and the like.

For simplicity and clarification, video or still image capture features of the presently disclosed systems and/or methods will be described as being used in conjunction with a mobile electronic device, such as, for example, a mobile phone. However, it should be appreciated that these are merely exemplary embodiments of the video or image capture features disclosed and are not to be construed as limiting the presently disclosed systems and/or methods. Thus, video or image capture of the presently disclosed systems and/or methods may be utilized in conjunction with any mobile electronic or other device capable of capturing video or still images.

Turning now to the appended drawing figures, FIGS. 1-4 illustrate certain elements and/or aspects of an exemplary embodiment of the video or image capture features of the presently disclosed systems and/or methods, while FIGS. 5-9 illustrate certain elements and/or aspects of an alternative exemplary embodiment of the video or image capture features of the presently disclosed systems and/or methods.

As illustrated in FIGS. 1-4, a mobile electronic device 100 is being utilized to capture video, according to the presently disclosed systems and/or methods. It should be appreciated that while the mobile electronic device 100 is being illustrated and described as capturing video, this is merely an exemplary embodiment and the mobile electronic device 100 may utilize the systems and/or methods of the present disclosure to digitally or electronically capture video or one or more still images.

Figure 2:
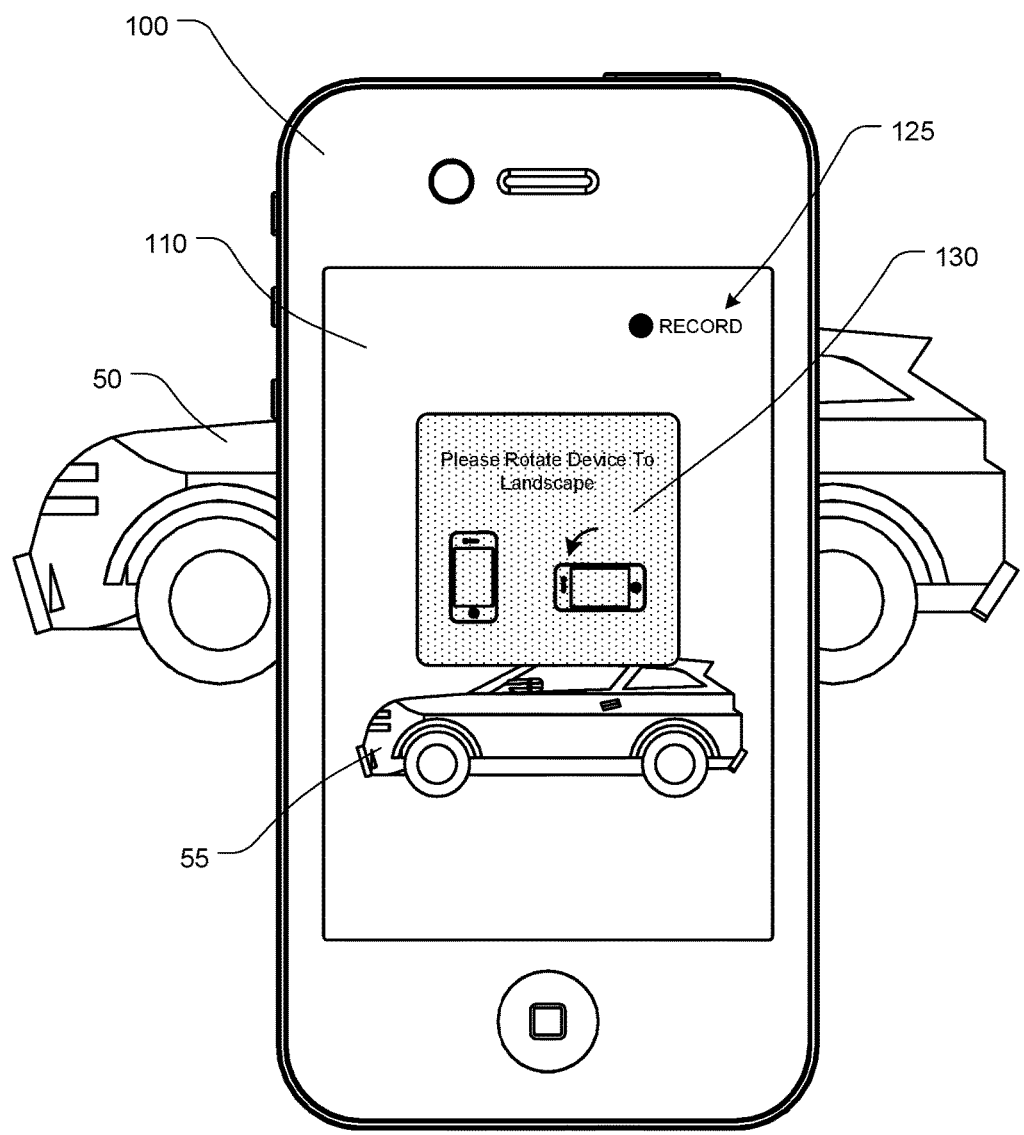
FIG. 2 illustrates an exemplary embodiment of a mobile electronic device being utilized to capture video, wherein the mobile electronic device is not oriented according to an established orientation preference, according to the presently disclosed systems and/or methods.
Figure 3:
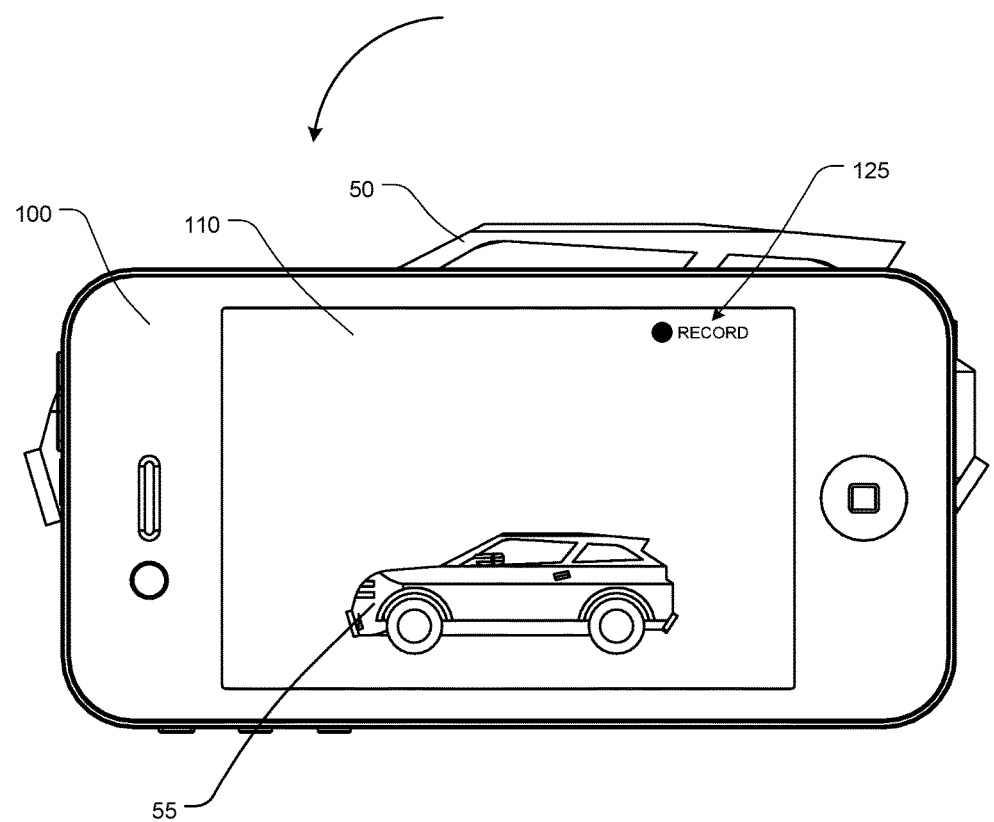
FIG. 3 illustrates an exemplary embodiment of a mobile electronic device being utilized to capture video, wherein the mobile electronic device has been reoriented such that the physical orientation of the mobile electronic device matches an established orientation preference, according to the presently disclosed systems and/or methods.

As illustrated in FIGS. 1-3, the mobile electronic device 100 comprises at least some of a display 110, which may also function as a touchscreen input device, one or more cameras configured to capture video and/or still images, an audio interface comprising at least one microphone, one or more device orientation sensors, such as, for example, an internal gyroscope and/or other device orientation sensors, and the requisite hardware and/or software for functional operation of the mobile electronic device 100.

In certain exemplary embodiments, the mobile electronic device 100 further comprises at least some of wireless transceiver capabilities, such as, for example, cellular, Bluetooth, or the like for exchanging data over various distances, Global Positioning System (GPS) receiving sensors and/or software for receiving GPS signals and providing geolocation data and information regarding the global position of the mobile electronic device 100.

It should be appreciated that this listing of features and/or elements included in the mobile electronic device 100 are exemplary and not exhaustive. Thus, it should be understood that the mobile electronic device 100, as shown and described, represents only one possible embodiment with one possible combination of features and elements. The features and elements that make up the mobile electronic device 100 and the methods for implementing required and optional software for operation of the mobile electronic device 100, are known in the art. Therefore, a more detailed explanation of the mobile electronic device 100, the constituent components of the mobile electronic device 100, instructions regarding how to incorporate the required and optional elements and/or software into the mobile electronic device 100, methods for implementing apps and software on the mobile electronic device 100, and certain other items and/or techniques necessary for the implementation and/or operation of the various exemplary embodiments of the presently disclosed systems and/or methods are not provided herein because such elements are commercially available and/or such background information will be known to one of ordinary skill in the art. Therefore, it is believed that the level of description provided herein with regard to the mobile electronic device 100 and implementation of the techniques, methods, and/or apparatuses of the present disclosure is sufficient to enable one of ordinary skill in the art to understand and practice the techniques and/or methods, as described.

It should also be appreciated that the systems and/or methods disclosed herein may be implemented as software executing on a mobile electronic device, a programmed general-purpose computer, a special purpose computer, a microprocessor, or the like. In various exemplary embodiments, the systems and/or methods disclosed herein may be implemented as an app residing in a mobile electronic device, a routine embedded in a network client, as a resource residing on a network server, or the like. The systems and/or methods disclosed herein may also be implemented by incorporation into a software and/or hardware system, such as the hardware or firmware systems of a mobile electronic device or the like. In general, any device, capable of implementing the systems and/or methods disclosed herein and that is, in turn, capable of implementing the steps outlined in the exemplary flowcharts shown in FIGS. 4 and 9, can be used to implement the systems and/or methods disclosed herein.

It should be appreciated that the captured video may be stored in a memory included in the mobile electronic device 100 and/or maybe uploaded or streamed for storage and/or real-time viewing. It should also be understood that this is merely an exemplary use of the mobile electronic device 100 and the systems and methods described herein may also be utilized as a user attempts to capture a still image or photograph for local storage and or uploading or streaming.

As illustrated in FIGS. 1-3, the systems and methods of the present disclosure are utilized by a mobile electronic device 100, while the mobile electronic device 100 is being implemented, as a user attempts to capture a video. As illustrated in FIG. 1, prior to capture of a video (or still image), a desired orientation preference is established or reset for the mobile electronic device 100.

In certain exemplary embodiments, as illustrated in FIG. 1, the user is able to establish or reset the desired orientation preference for the mobile electronic device. In these exemplary embodiments, the user is presented with a preference selection screen 112, presenting the possible options for video capture orientation to the user. In this exemplary embodiment, the user is able to select between a portrait orientation and a landscape orientation for video capture. As illustrated by the selected radio button, the user has selected the landscape orientation option for video capture by the mobile electronic device 100. Once selected, and until altered by the user, the systems and methods of the present disclosure utilize the selected, desired orientation preference for all video capture. It should be appreciated that the same selected, desired orientation preference may be utilized for both video and still image capture or separate orientation preferences may be established for video and still image capture.

In certain exemplary embodiments, the user is not presented with the preference selection screen 112, and the desired orientation preference is established (or overridden) by, for example, the application within which the user will be capturing the video (or still images) or a desired end user or recipient of the captured video (or still image). For example, if a user is capturing live, streaming video for a news network or social media, the application through which the user captures the video may automatically set to the desired orientation preference to, for example, a landscape orientation.

Once the desired orientation preference has been established (by the user or otherwise), the desired orientation preference is stored, utilizing the systems and/or methods of the present disclosure.

FIG. 2 illustrates an attempt by a user to capture a video of an object 50, while the mobile electronic device 100 is being maintained in a substantially vertical orientation. Because the mobile electronic device 100 is being held in a substantially vertical (portrait) orientation, the mobile electronic device 100 forces the object image 55 to be displayed on the display 110 in a substantially vertical (portrait) orientation, because that is the physical orientation of the mobile electronic device 100.

Figure 4:
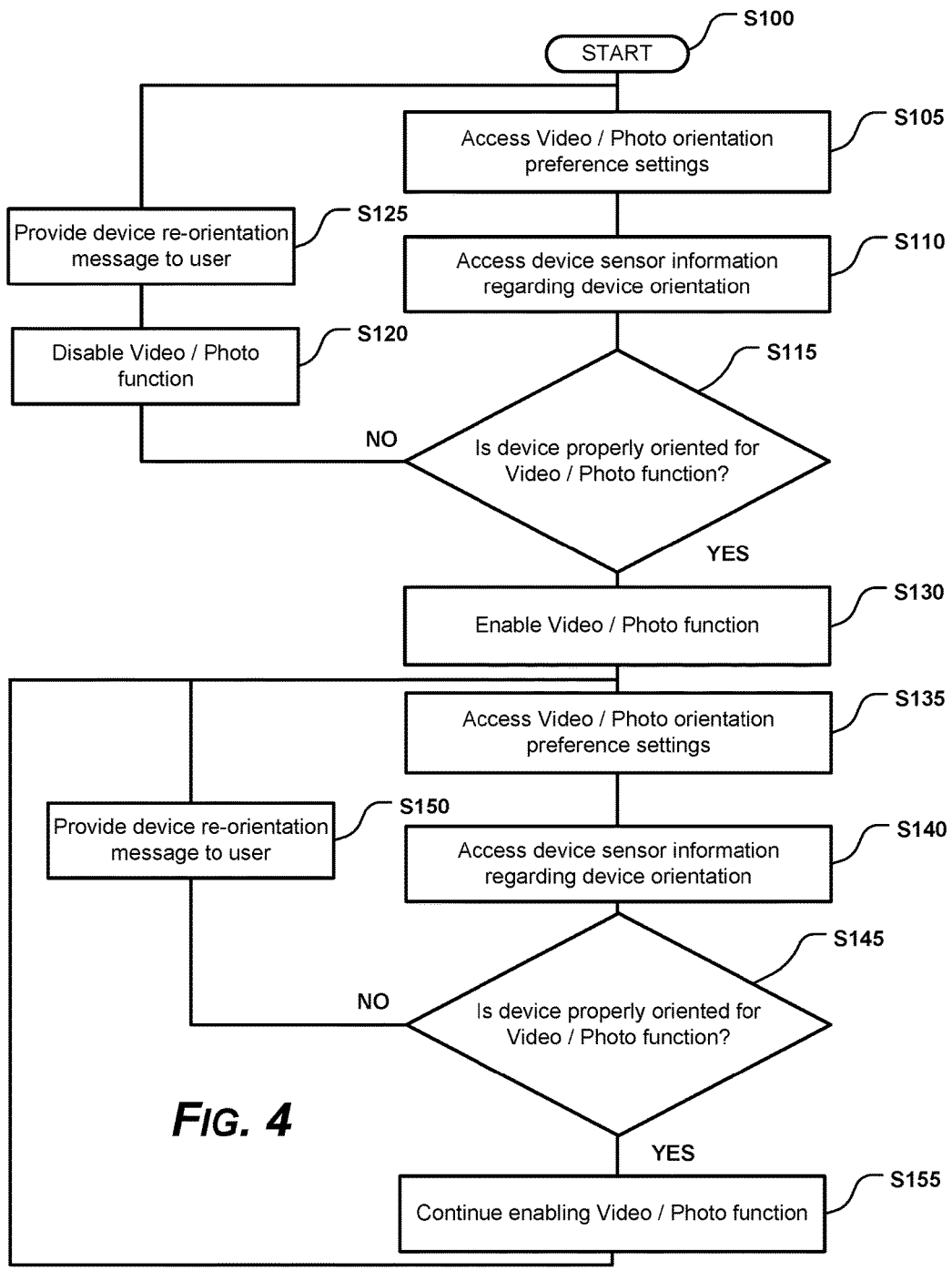
FIG. 4 illustrates an exemplary flowchart outlining exemplary steps for forcing a user to orient a mobile electronic device to an established orientation preference prior to enabling video or still image capturing features of the mobile electronic device, according to the presently disclosed systems and/or methods.

Utilizing the features of the present disclosure, as further illustrated in FIGS. 2-3, and following the exemplary steps shown in FIG. 4, if a user selects a video capture option of the mobile electronic device 100, an exemplary method associated with the present disclosure begins before the user is able to begin capturing the video. As illustrated, the exemplary method begins at step S100 and control continues to step S105, wherein the systems and methods of the present disclosure access information regarding the desired orientation preference that has been established, either by the user or otherwise. Once the desired orientation preference information has been accessed, the method continues to step S110 and the systems and methods of the present disclosure access information from sensors or the like embedded within the mobile electronic device 100 to determine the current physical orientation of the mobile electronic device 100.

Once the device orientation information has been obtained, the method continues to step S115 and the desired orientation preference information is compared to the current physical orientation information and a determination is made as to whether the current physical orientation of the mobile electronic device 100 matches the desired orientation preference, within a determined degree of variance. In this manner, an exact match may not always be required. For example, it may be determined that the desired orientation preference is landscape (representing an orientation of 0°) and that the current physical orientation of the mobile electronic device 100 is +3°. If the determined degree of variance is established at plus or minus 5°, a current physical orientation of +3° would still render a determination that the current physical orientation matches the desired orientation preference. Alternatively, if the determined degree of variance is established at plus or minus 3°, a current physical orientation of +5° would render a determination that the current physical orientation does not match the desired orientation preference.

If, in step S115, it is determined that the current physical orientation of the mobile electronic device 100 does not match the desired orientation preference (i.e., the desired orientation preference is for a landscape orientation and the current physical orientation of the mobile electronic device 100 is a portrait orientation), the method continues to step S120 and the video capture function of the mobile electronic device 100 is at least temporarily disabled. Then, in step S125, and as illustrated in FIG. 2, a device reorientation message is displayed to the user. In various exemplary embodiments, the device reorientation message is presented to the user as user alert pop-up 130. The user alert pop-up 130 informs the user that the mobile electronic device 100 must be reoriented before video recording can begin. Optionally, a record status indicator 125 is also displayed for the user. While the video capture function of the mobile electronic device 100 is disabled, the record status indicator 125 indicates that video is not being recorded.

In various exemplary embodiments, the device reorientation message is presented to the user as an audio alert or message, via the audio interface of the mobile electronic device 100.

The method then optionally returns to step S105, step S110, or step S115 to determine whether the orientation of the mobile electronic device 100 has been altered, producing at least some subsequent information regarding the current physical orientation of the mobile electronic device 100. If the user properly reorients the mobile electronic device, such that the physical orientation of the mobile electronic device matches the established orientation preference, the device reorientation message is removed from the display and the video or still image capture function of the mobile electronic device is enabled.

Thus, if it is determined in step S115 that the current physical orientation of the mobile electronic device 100 matches the desired orientation preference, the method advances to step S130 and the video capture function of the mobile electronic device 100 is enabled. In various exemplary embodiments, the record status indicator 125 then indicates to the user when video is being captured.

The method then optionally continues to step S135, wherein the systems and methods of the present disclosure access information regarding the established, desired orientation preference. Once the desired orientation preference information has been accessed, the method continues to step S140 and the systems and methods of the present disclosure access information from sensors or the like embedded within the mobile electronic device 100 to determine the current physical orientation of the mobile electronic device 100.

Once the device orientation information has been obtained, the method continues to step S145 and the desired orientation preference information is compared to the current physical orientation information and a determination is made as to whether the current physical orientation of the mobile electronic device 100 matches the desired orientation preference, within a determined degree of variance.

If, in step S145, it is determined that the current physical orientation of the mobile electronic device 100 does not match the desired orientation preference (i.e., the user is in the midst of capturing video and has reoriented the mobile electronic device 100 out of the desired orientation preference), the method continues to step S150, and a device reorientation message is displayed to the user. In various exemplary embodiments, the device reorientation message is presented to the user as user alert pop-up 130. The user alert pop-up 130 informs the user that the mobile electronic device 100 must be reoriented.

Utilizing optional steps S135-S155, if, while in the midst of capturing a video or still image, the user shifts the mobile electronic device 100 from the desired orientation preference, a device reallocation message is displayed for the user, while said video or still image capture function of the mobile electronic device 100 continues to be enabled.

The method continues until the user stops the video capture using the video capture function of the mobile electronic device 100.

In various exemplary embodiments, the method begins each time a video or still image capture function of the mobile electronic device is accessed or each time a user attempts to capture a discrete video or still image.

Thus, in various exemplary embodiments, the systems and/or methods of the present disclosure operate by accessing the gyroscope contained in the mobile electronic device 100 to determine whether the mobile electronic device 100 is in a horizontal or vertical state. If it is determined that the mobile electronic device 100 is in a vertical state, the display 110 informs the user that the mobile electronic device 100 must be turned horizontally. This feature prevents the user from continuing without first turning the mobile electronic device 100 horizontally. If it is determined that the mobile electronic device 100 is in a horizontal state, the user is permitted to proceed. It should be appreciated that the systems and/or methods of the present disclosure are not limited to forcing a horizontal orientation of the mobile electronic device 100, but also operate to force the user to orient the mobile electronic device 100 to any other desired orientation, such as, for example, horizontal orientation, vertical orientation, diagonal orientation, or any other desired orientation.

In the various exemplary embodiments illustrated in FIGS. 2-4, if the mobile electronic device 100 is not properly oriented, user compliance and reorientation of the mobile electronic device 100 is required in order to enable the video or still image capture function of the mobile electronic device. In certain alternative embodiments, as illustrated in FIGS. 5-9, the systems and/or methods of the present disclosure provide for video or still image capture by the mobile electronic device 100, which is controlled such that the captured video or still image is oriented according to an established orientation preference, regardless of the physical orientation of the mobile electronic device 100.

According to these exemplary, nonlimiting embodiments of the present disclosure, an application (app) or software operating on the mobile electronic device 100 controls the video or still image capture feature of the mobile electronic device 100 to orient the video or still image capture, through software, to force the mobile electronic device 100 to capture video or still images at the established orientation preference, regardless of the physical orientation of the mobile electronic device 100. This provides video or still image capture according to the established orientation preference, regardless of the physical orientation of the mobile electronic device 100 and does not require user action or compliance to enable video or still image capture.

In various exemplary, nonlimiting embodiments of the present disclosure, an application (app) or software operating on the mobile electronic device 100 controls the mobile electronic device 100 to re-scale and/or appropriately crop landscape or portrait video to a landscape (i.e., horizontal or widescreen) perspective, before capturing and/or transmitting video or still images. This feature utilizes, for example, the internal gyroscope of the mobile electronic device 100 to maintain a landscape or horizontal perspective, no matter the viewing angle, tilt, planar rotation, or orientation of the device.

As with the exemplary methods illustrated and described with respect to FIGS. 1-4, the exemplary methods illustrated and described with reference to FIGS. 5-9 optionally began with the establishment (or a reset) of a desired orientation preference for the mobile electronic device 100.

It should be understood and appreciated that establishment (or reset) of the desired orientation preference for the mobile electronic device, as utilized with the methods illustrated and described with reference to FIGS. 5-9, may be accomplished as described above and as illustrated in FIG. 1. Once the desired orientation preference has been established (by the user or otherwise), the desired orientation preference is stored, utilizing the systems and/or methods of the present disclosure.

Figure 5:
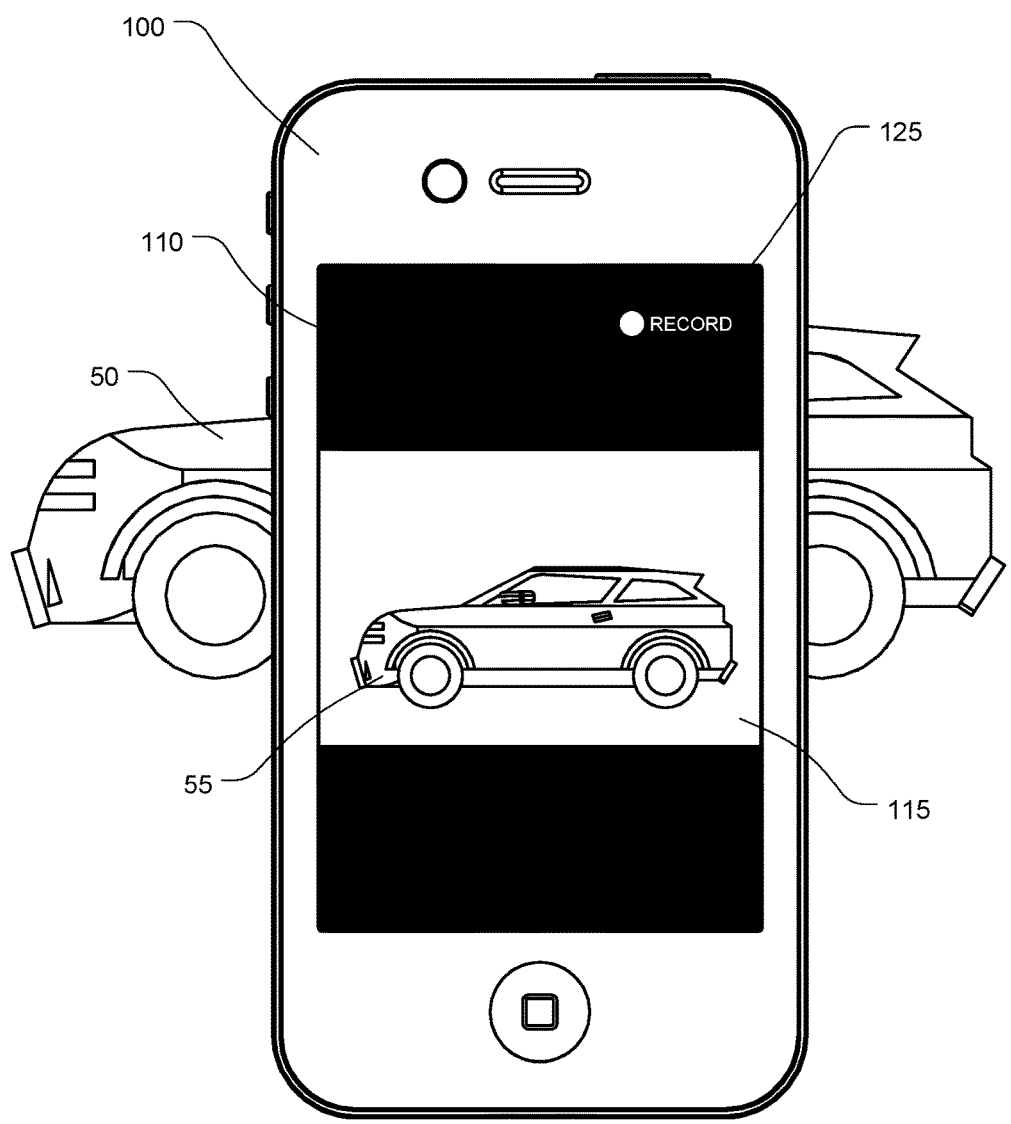
FIG. 5 illustrates an exemplary embodiment of a mobile electronic device, wherein the mobile electronic device is presented in a vertical orientation, being utilized to capture video, wherein the video capture of the mobile electronic device is controlled such that the captured video is oriented according to an established orientation preference, according to the presently disclosed systems and/or methods.

FIG. 5 illustrates an attempt by a user to capture a video of an object 50, while the mobile electronic device 100 is being maintained in a substantially vertical orientation. Using known technology, the mobile electronic device 100 would force the object image 55 to be displayed on the display 110 in a substantially vertical (portrait) orientation (and capture and/or transmit video in a portrait orientation), because the mobile electronic device 100 is being physically held in a substantially vertical (portrait) orientation. However, utilizing the systems and methods of the present invention, the object image 55 is automatically displayed on the display 110 within a record area 115, as dictated by the desired orientation preference and resultant video is captured utilizing the desired orientation preference.

Figure 6:
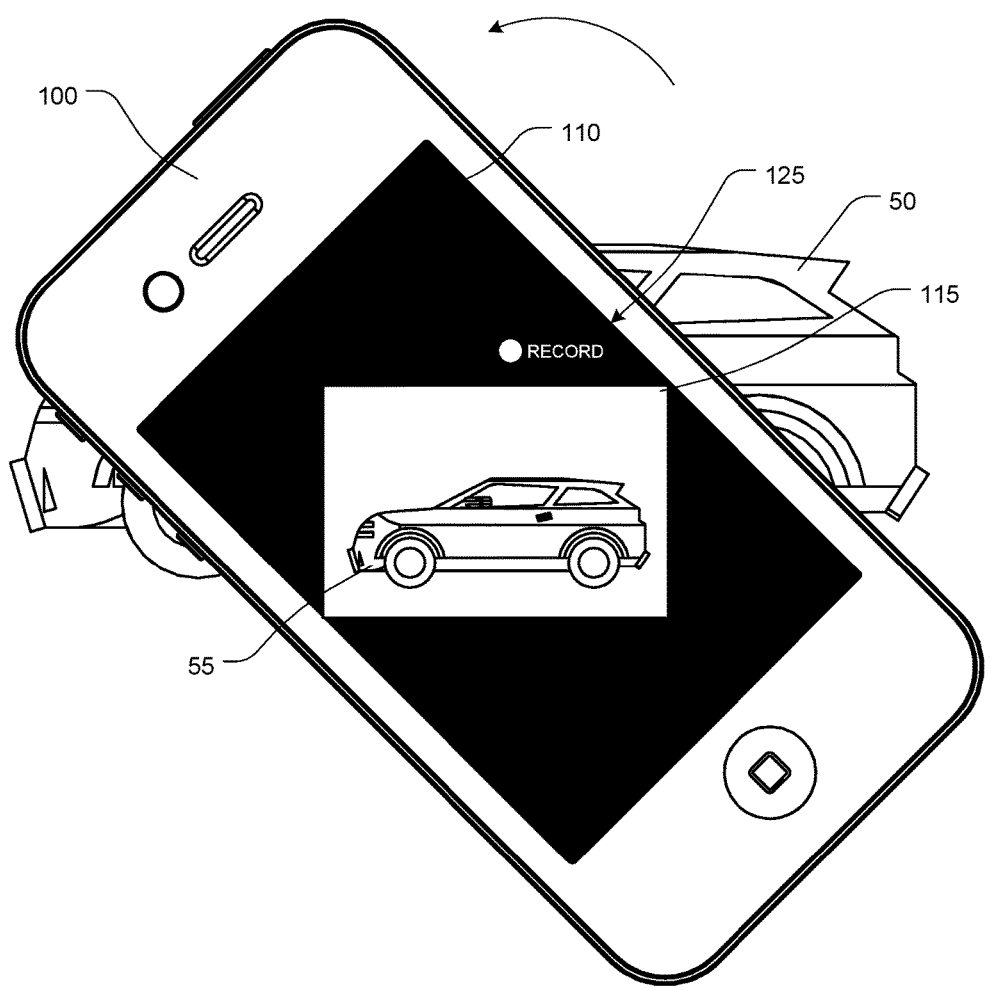
FIG. 6 illustrates an exemplary embodiment of a mobile electronic device, wherein the mobile electronic device is presented at a diagonal or obtuse orientation, being utilized to capture video, wherein the video capture of the mobile electronic device is controlled such that the captured video is oriented according to an established orientation preference, according to the presently disclosed systems and/or methods.
Figure 7:
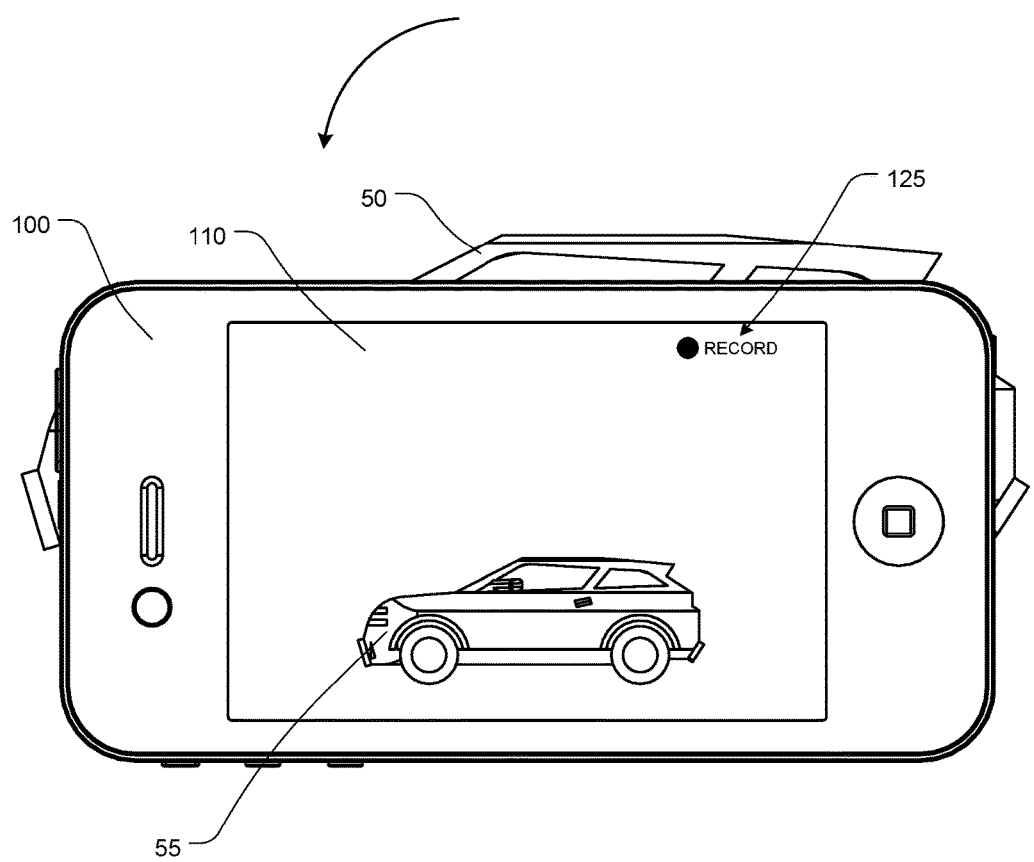
FIG. 7 illustrates an exemplary embodiment of a mobile electronic device, wherein the mobile electronic device is presented at a horizontal orientation, being utilized to capture video, wherein the video capture of the mobile electronic device is controlled such that the captured video is oriented according to an established orientation preference, according to the presently disclosed systems and/or methods.
Figure 9:
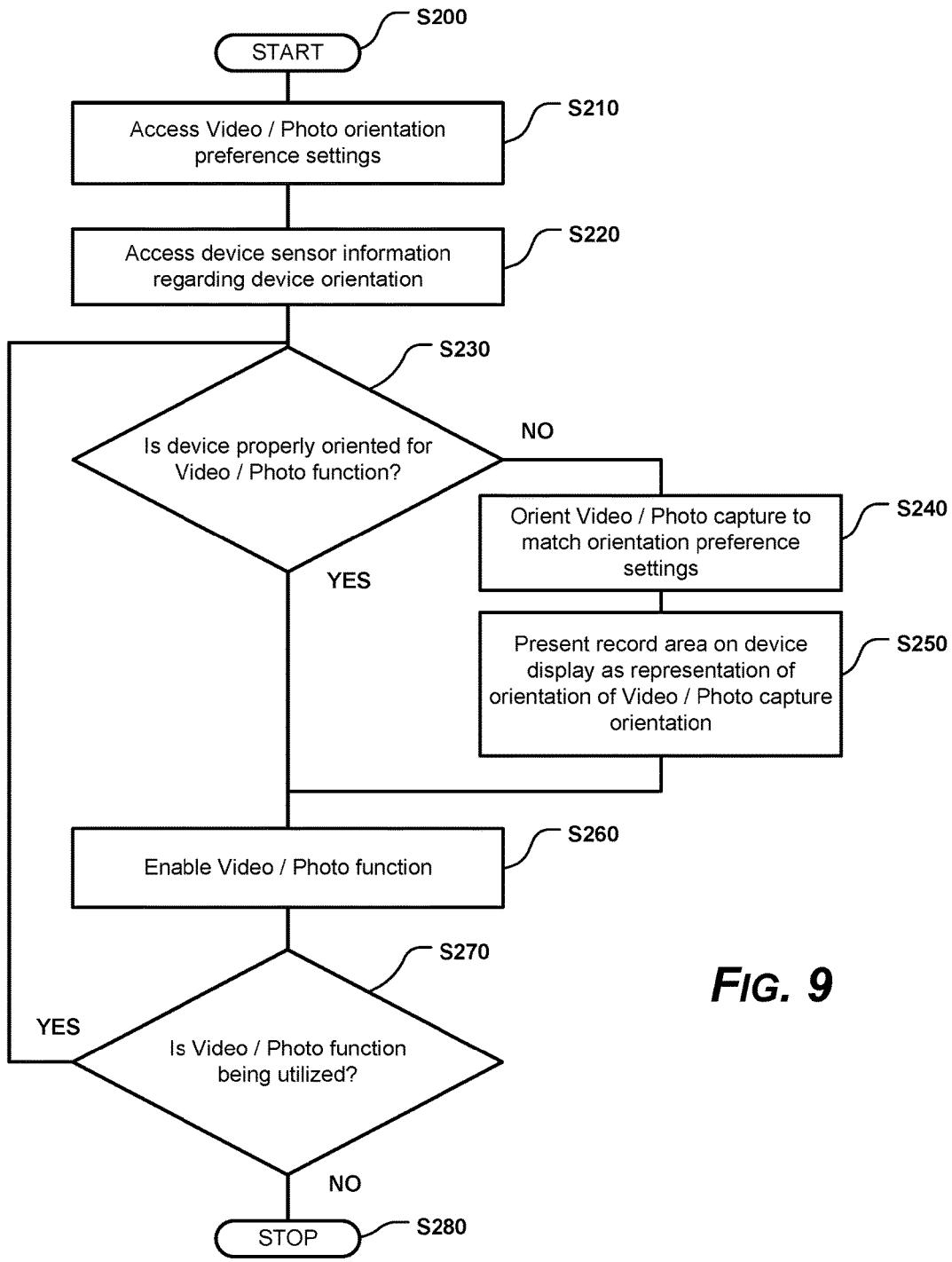
FIG. 9 illustrates an exemplary flowchart outlining exemplary steps for controlling the video or still image capture feature of a mobile electronic device to capture video or still images at an established orientation preference, regardless of the physical orientation of the mobile electronic device, according to the presently disclosed systems and/or methods.

Utilizing the features of the present disclosure, as illustrated in FIGS. 5-7, and following the exemplary steps shown in FIG. 9, if a user selects a video capture option of the mobile electronic device 100, an exemplary method associated with the present disclosure begins before the user is able to begin capturing the video. As illustrated, the exemplary method begins at step S200 and control continues to step S210, wherein the systems and methods of the present disclosure access information regarding the desired orientation preference that has been established, either by the user or otherwise.

Once the desired orientation preference information has been accessed, the method continues to step S220 and the systems and methods of the present disclosure access information from sensors or the like embedded within the mobile electronic device 100 to determine the current physical orientation of the mobile electronic device 100.

Once the device orientation information has been obtained, the method continues to step S230 and the desired orientation preference information is compared to the current physical orientation information and a determination is made as to whether the current physical orientation of the mobile electronic device 100 matches the desired orientation preference. In various exemplary embodiments, the determination is made as to whether the current physical orientation of the mobile electronic device 100 matches the desired orientation preference, within a determined degree of variance. In this manner, an exact match may not always be required. For example, it may be determined that the desired orientation preference is landscape (representing an orientation of 0°) and that the current physical orientation of the mobile electronic device 100 is +3°. If the determined degree of variance is established at plus or minus 5°, a current physical orientation of +3° would still render a determination that the current physical orientation matches the desired orientation preference. Alternatively, if the determined degree of variance is established at plus or minus 3°, a current physical orientation of +5° would render a determination that the current physical orientation does not match the desired orientation preference.

If, in step S230, it is determined that the current physical orientation of the mobile electronic device 100 does not match the desired orientation preference (i.e., the desired orientation preference is for a landscape orientation and the current physical orientation of the mobile electronic device 100 is a portrait orientation), the method continues to step S240 and the video capture function of the mobile electronic device 100 is oriented, via software embedded within or accessed by the mobile electronic device 100, such that, in step S240, video will be captured at the desired orientation preference. Then, in step S250, the display 110 presents the object image 155 the desired orientation preference, within record area 115. Any remaining area within the display 110 that is not within the record area 115 may optionally be darkened out to present the record area 115 in a "shoebox" style presentation. Optionally, a record status indicator 125 is also displayed for the user. In various exemplary embodiments, only the video displayed in the "shoebox" is stored and/or transmitted.

Figure 8:
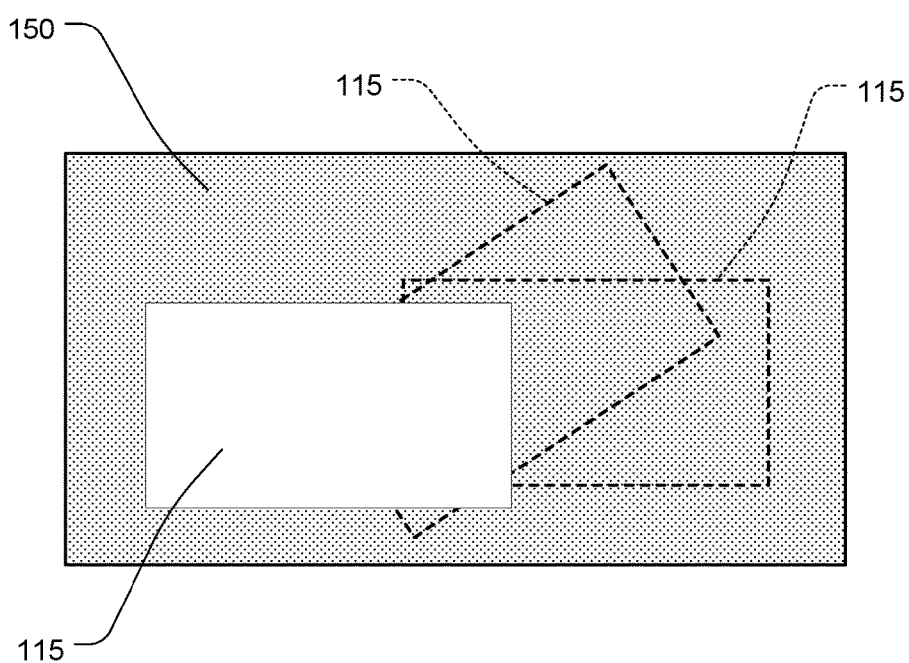
FIG. 8 illustrates an exemplary embodiment of an available video capture area compared to a selected, record area, according to the presently disclosed systems and/or methods.

As illustrated in FIG. 8 illustrates an exemplary embodiment of an available video capture area 150 compared to a selected, record area 115. In an exemplary embodiment, the available video capture area 150 represents the maximum video capture area provided by the mobile electronic device 100. The selected, record area 115 represents the selected area to which the actually recorded video will be cropped or reduced. By way of example, if the mobile electronic device is able to capture 4K video, the available video capture area 150 may represent a pixel density of 4096×2160. If the determined record area 115 is for 1080p, the record area 115 may represent a pixel density of 1920×1080. It should be appreciated that these are merely exemplary and are not to be construed as limiting the present disclosure.

By selecting a record area 115 within the available video capture area 150, as the mobile electronic device 100 is manipulated, the aspect ratio of the record area 115 is maintained and can allow for various orientations of the record area 115.

In addition, by selecting a record area 115 that is less than the available video capture area 150, the bandwidth required to upload or stream the video recorded from the record area 115 is less than the bandwidth required to upload or stream video recorded from the available video capture area 150.

Control then advances to step S260 and the video capture function of the mobile electronic device 100 is enabled, such that the user may begin capturing video.

If the video capture function of the mobile electronic device 100 is enabled, the method continues to step S270, where and a determination is made as to whether the video function is being utilized and video is being captured.

The method then optionally returns to step S210, step S220, or step S230 to determine whether the orientation of the mobile electronic device 100 has been altered, producing at least some subsequent information regarding the current physical orientation of the mobile electronic device 100. If the user properly reorients the mobile electronic device, such that the physical orientation of the mobile electronic device matches the established orientation preference, the device reorientation message is removed from the display and the video or still image capture function of the mobile electronic device is enabled.

Thus, if it is determined in step S230 that the current physical orientation of the mobile electronic device 100 matches the desired orientation preference, the method advances to step S260 and the video capture function of the mobile electronic device 100 is enabled. When the video capture function of the mobile electronic device 100 is enabled, the method continues to step S270, where the method ends and the user is able to capture video. In various exemplary embodiments, the record status indicator 125 indicates to the user when video is being captured.

If, in step S270, it is determined that the video function is being utilized and video is being captured, the method returns to step S230. Each time that steps S230-S270 are repeated, the orientation of the captured video and the orientation of the display area 115 may potentially be altered, such that video is captured at the established orientation preference.

It should be understood that steps S230-S270 may be repeated as frequently as desired.

If, in step S270, it is determined that the video function is not being utilized and video is not being captured, the method advances to step S280 and the method ends.

In various exemplary embodiments, the method begins each time a user attempts to capture a discrete video or still image.

In various exemplary, nonlimiting embodiments, the systems and/or methods of the present disclosure provide a software feature that re-scales and/or crops vertical video (or whatever state) to a horizontal (i.e., widescreen) perspective, before capturing and/or transmitting video or still images. This feature uses the internal gyroscope of the mobile electronic device 100 to maintain a horizontal perspective no matter the viewing angle tilt of the mobile electronic device 100.

For example, when steaming live video utilizing current technology, such as, for example, cell phone towers, the quality streamed is significantly lower than the capability of mobile electronic device 100. Mobile electronic devices 100 current force a horizontal (i.e., widescreen, such as 16×9) aspect ratio only when the mobile electronic device 100 is held in a horizontal position. Because the pixel density is higher on the mobile electronic device 100 than can be streamed on current cell phone networks, the vertical pixel density remains higher than the streamable horizontal density. Hence, the technology can create a cropped vertical stream when the mobile electronic device 100 is held vertically. This can create a widescreen stream, at quality levels still greater than cell phone towers can handle without the user turning the mobile electronic device 100 horizontally.

By cropping the video and scaling quality based upon available cell network throughput, the systems and/or methods of the present disclosure can maximize the available throughput by only sending the post-cropped and scaled video.

In principle, a receiver of a video stream could crop the vertical image by cutting off the top and bottom of the stream, and thereby accomplish the same goal of a horizontal stream. However, the systems and/or methods of the present disclosure accomplish this more effectively and efficiently at least by saving the streaming of unused data from the top and the bottom of the video stream, and optionally increasing the quality of the horizontal stream. Additionally, the systems and/or methods of the present disclosure are more efficient, as they do not transmit the data at the top and bottom.

Thus, the systems and methods of the present disclosure can use the unused available data throughput available from the cell tower to increase the quality of the visible component.

Additionally, the systems and methods of the present disclosure display the actual aspect ratio to the user as the video is being captured, which allows the user to capture video in a manner than is appropriate for the aspect ratio. Otherwise, the user may inadvertently cut off part of what is needed in the capture video. By allowing the user to see how the video will be captured and/or streamed, the user better understands how best to frame captured video or still images.

While the presently disclosed systems and/or methods have been described in conjunction with the exemplary embodiments outlined above, the foregoing description of exemplary embodiments of the presently disclosed systems and/or methods, as set forth above, are intended to be illustrative, not limiting and the fundamental disclosed systems and/or methods should not be considered to be necessarily so constrained. It is evident that the presently disclosed systems and/or methods is not limited to the particular variation set forth and many alternatives, adaptations modifications, and/or variations will be apparent to those skilled in the art.

It is to be understood that the phraseology of terminology employed herein is for the purpose of description and not of limitation. Unless defined otherwise, all technical and scientific terms used herein have the same meaning as commonly understood by one of ordinary skill in the art to which the presently disclosed systems and/or methods belongs.

In addition, it is contemplated that any optional feature of the inventive variations described herein may be set forth and claimed independently, or in combination with any one or more of the features described herein.

Accordingly, the foregoing description of exemplary embodiments will reveal the general nature of the presently disclosed systems and/or methods, such that others may, by applying current knowledge, change, vary, modify, and/or adapt these exemplary, non-limiting embodiments for various applications without departing from the spirit and scope of the presently disclosed systems and/or methods and elements or methods similar or equivalent to those described herein can be used in practicing the presently disclosed systems and/or methods. Any and all such changes, variations, modifications, and/or adaptations should and are intended to be comprehended within the meaning and range of equivalents of the disclosed exemplary embodiments and may be substituted without departing from the true spirit and scope of the presently disclosed systems and/or methods.

Also, it is noted that as used herein and in the appended claims, the singular forms "a", "and", "said", and "the" include plural referents unless the context clearly dictates otherwise. Conversely, it is contemplated that the claims may be so-drafted to require singular elements or exclude any optional element indicated to be so here in the text or drawings. This statement is intended to serve as antecedent basis for use of such exclusive terminology as "solely", "only", and the like in connection with the recitation of claim elements or the use of a "negative" claim limitation(s).

What is claimed is:

1. A method for capturing video or still images at a determined orientation, via a camera associated with a mobile electronic device, comprising:
   accessing at least some information regarding a desired orientation preference for said mobile electronic device;
   accessing at least some information regarding a physical orientation of said mobile electronic device;
   comparing said information regarding said physical orientation of said mobile electronic device to said information regarding said desired orientation preference for said mobile electronic device;
   determining whether said information regarding said physical orientation of said mobile electronic device matches said information regarding said desired orientation preference for said mobile electronic device, within a determined degree of variance; and
   disabling, if said information regarding said physical orientation of said mobile electronic device does not match said desired orientation preference for said mobile electronic device, within said determined degree of variance, a video or still image capture function of said mobile electronic device.

2. The method of claim 1, further comprising:
   presenting, while said video or still image capture function of said mobile electronic device is disabled, a device reorientation message;
   accessing at least some subsequent information regarding a subsequent physical orientation of said mobile electronic device;
   determining whether said subsequent information regarding said subsequent physical orientation of said mobile electronic device matches said information regarding said desired orientation preference for said mobile electronic device, within said determined degree of variance; and
   enabling, if said subsequent information regarding said subsequent physical orientation of said mobile electronic device matches said desired orientation preference for said mobile electronic device, within said determined degree of variance, said video or still image capture function of said mobile electronic device.

3. The method of claim 1, wherein said at least some information regarding said desired orientation preference for said mobile electronic device is established by a user of said mobile electronic device.

4. The method of claim 1, wherein said at least some information regarding said desired orientation preference for said mobile electronic device is established by an application running on said mobile electronic device.

5. The method of claim 1, wherein said at least some information regarding said physical orientation of said mobile electronic device is determined based on information from sensors embedded within said mobile electronic device.

6. The method of claim 1, wherein said determined degree of variance is established such that said determination that said information regarding said desired orientation preference for said mobile electronic device matches said information regarding said physical orientation of said mobile electronic device if said compared information is within a determined range.

7. The method of claim 1, wherein said device reorientation message is presented on a display of said mobile electronic device.

8. The method of claim 1, wherein said device reorientation message provides information regarding said desired orientation preference for said mobile electronic device.

9. The method of claim 1, wherein said device reorientation message is presented as an audio alert or message, via an audio interface of said mobile electronic device.

10. The method of claim 1, further comprising:
   accessing at least some subsequent information regarding a subsequent physical orientation of said mobile electronic device;
   determining whether said subsequent information regarding said subsequent physical orientation of said mobile electronic device matches said information regarding said desired orientation preference for said mobile electronic device, within said determined degree of variance; and
   presenting, while said video or still image capture function of said mobile electronic device is enabled, a device reorientation message, while continuing to enable said video or still image capture function.

11. A method for capturing video or still images at a determined orientation, via a camera associated with a mobile electronic device, comprising:
   accessing at least some information regarding a desired orientation preference for said mobile electronic device;
   accessing at least some information regarding a physical orientation of said mobile electronic device;
   comparing said information regarding said physical orientation of said mobile electronic device to said information regarding said desired orientation preference for said mobile electronic device;
   determining whether said information regarding said physical orientation of said mobile electronic device matches said information regarding said desired orientation preference for said mobile electronic device, within a determined degree of variance;
   enabling, if said information regarding said physical orientation of said mobile electronic device matches said desired orientation preference for said mobile electronic device, within said determined degree of variance, a video or still image capture function of said mobile electronic device;
   disabling, if said information regarding said physical orientation of said mobile electronic device does not match said desired orientation preference for said mobile electronic device, within said determined degree of variance, said video or still image capture function of said mobile electronic device;
   presenting, while said video or still image capture function of said mobile electronic device is disabled, a device reorientation message, wherein said device reorientation message provides information regarding said desired orientation preference for said mobile electronic device;
   accessing at least some subsequent information regarding a subsequent physical orientation of said mobile electronic device;
   determining whether said subsequent information regarding said subsequent physical orientation of said mobile electronic device matches said information regarding said desired orientation preference for said mobile electronic device, within said determined degree of variance; and
   enabling, if said subsequent information regarding said subsequent physical orientation of said mobile electronic device matches said desired orientation preference for said mobile electronic device, within said determined degree of variance, said video or still image capture function of said mobile electronic device.

12. The method of claim 11, wherein said at least some information regarding said desired orientation preference for said mobile electronic device is established by a user of said mobile electronic device.

13. The method of claim 11, wherein said at least some information regarding said desired orientation preference for said mobile electronic device is established by an application running on said mobile electronic device.

14. The method of claim 11, wherein said at least some information regarding said physical orientation of said mobile electronic device is determined based on information from sensors embedded within said mobile electronic device.

* * * * *